Aug. 8, 1967         M. DI GIOVANNI         3,335,381
DUPLEX FLEXURE FOR FORCE TRANSDUCER
Filed July 6, 1965                                 3 Sheets-Sheet 1
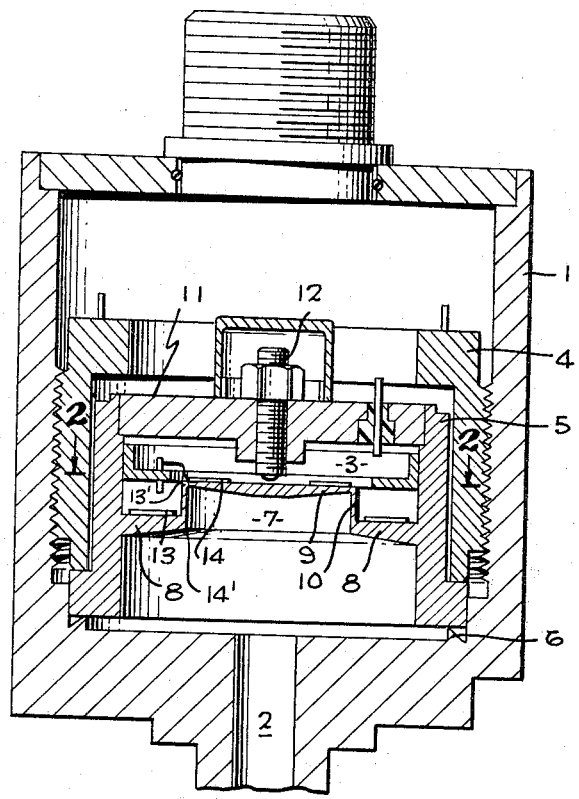
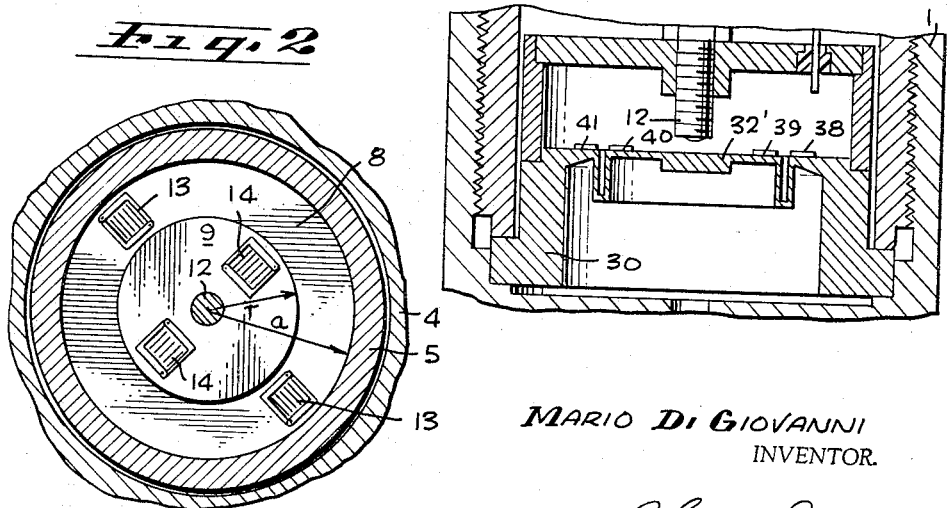
MARIO DI GIOVANNI
INVENTOR.
BY
ATTORNEY Aug. 8, 1967   M. DI GIOVANNI   3,335,381
DUPLEX FLEXURE FOR FORCE TRANSDUCER
Filed July 6, 1965   3 Sheets-Sheet 2
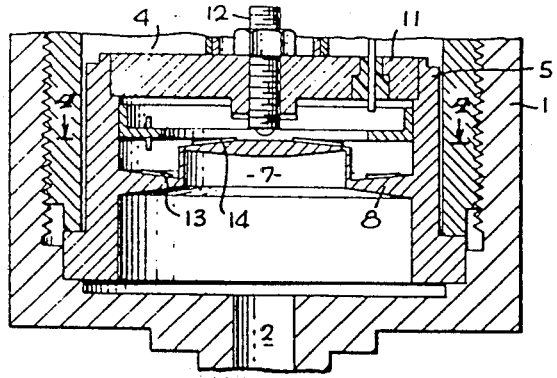
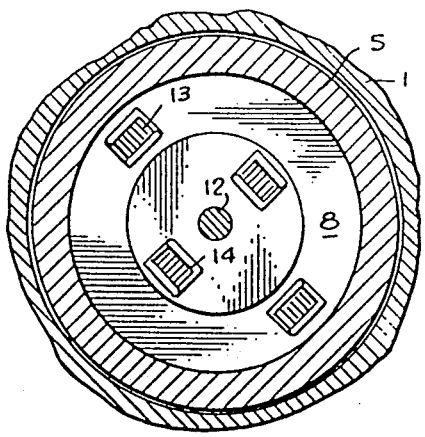
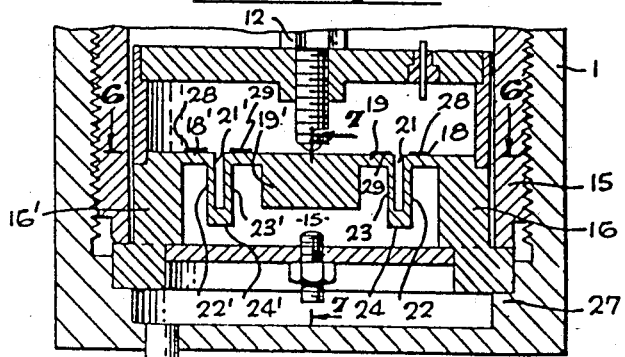
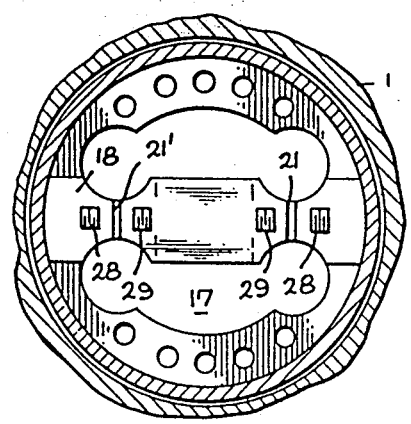
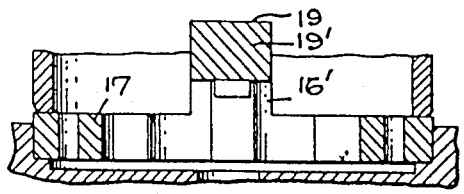
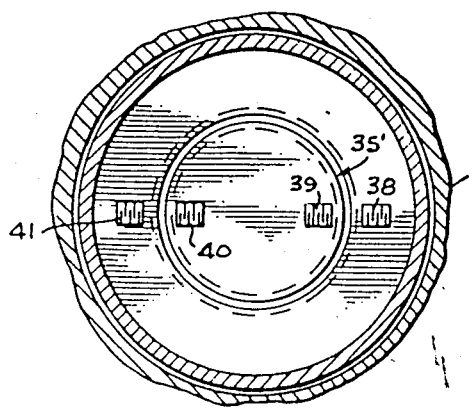
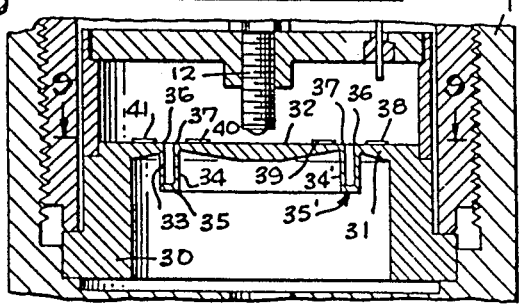
INVENTOR.
MARIO DI GIOVANNI
BY
ATTORNEY Aug. 8, 1967 M. DI GIOVANNI 3,335,381
DUPLEX FLEXURE FOR FORCE TRANSDUCER
Filed July 6, 1965 3 Sheets-Sheet 2
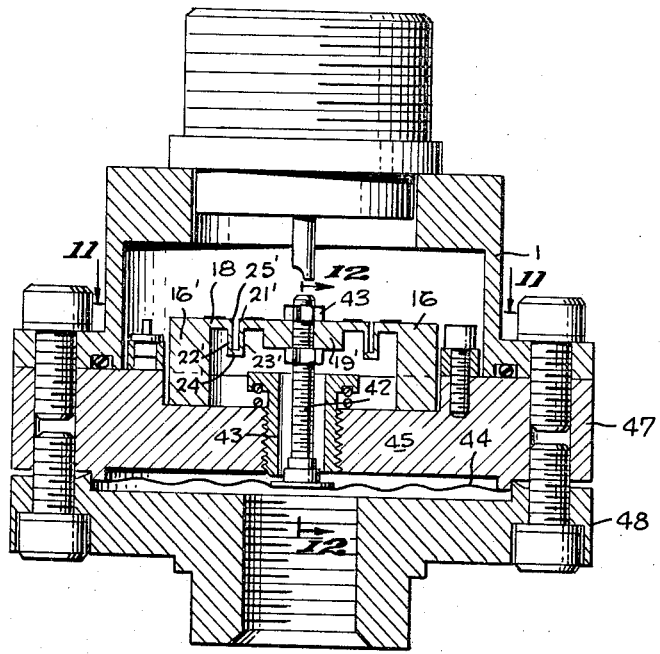
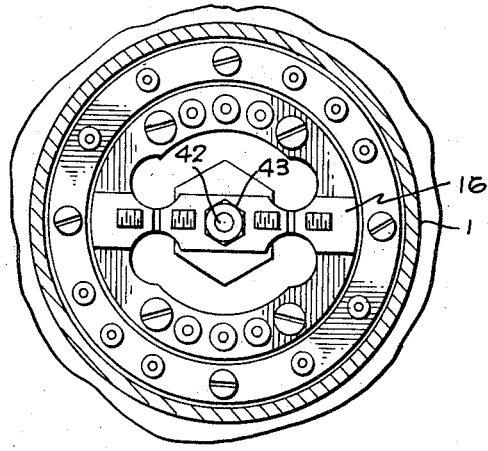
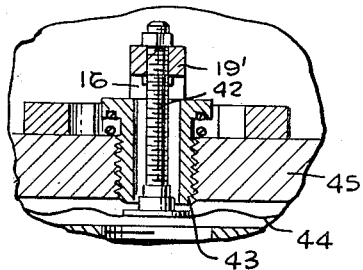
MARIO DI GIOVANNI
INVENTOR.
BY
ATTORNEY

United States Patent Office 3,335,381
Patented Aug. 8, 1967

3,335,381
DUPLEX FLEXURE FOR FORCE TRANSDUCER
Mario Di Giovanni, Pacific Palisades, Calif., assignor to Stratham Instruments, Inc., Los Angeles, Calif., a corporation of California
Filed July 6, 1965, Ser. No. 469,712
14 Claims. (Cl. 338—4)

This invention relates to flexures such as may be employed in transducers as force summing or force transmitting elements.

In transducers in which a flexure is used to translate a force, applied to the transducer, into a displacement of the flexure, the magnitude of the signal developed by the transducer depends on the magnitude of the displacement of flexure. It is a desirable property of such transducers that the signal level vary directly, that is, linearly with the force applied to the transducer and be as large a multiple or fraction of this force as is convenient.

Where the flexure is rigidly connected at its ends, if a beam, or if a diaphragm where it is clamped, that is, rigidly connected to the support at its periphery, these requirements present the designer with a dilemma.

In the usual case, for a flexure of a given length and width, if a beam, or of a given active area if a diaphragm, the flexure may be made to have an increased deflection for a given applied force, by increasing the length or active area, or by decreasing the thickness or both. The non-linearity of deflection of flexure as a function of applied force is not, in any substantial manner, affected by the length of the flexure if a beam, or the active area if a diaphragm.

The non-linearity is a function substantially only of the ratio of the deflection of the flexure to its thickness. The result is that a decrease in the thickness of the flexure, in order to increase its deflection, increases the non-linearity of the diaphragm as a function of displacement.

These consequences arise from the presence of membrane stresses. The usual accepted criterion is that deflection at the center, in excess of about one quarter of the thickness of the diaphragm, introduces a sufficient tensile force in the diaphragm to become a material factor in the linearity of the diaphragm. The membrane stress acts in two ways: first, it acts to increase the stiffness of the diaphragm, thus reducing the deflection of the diaphragm under constant applied force; the other is that the membrane stress is a function of displacement and thus the stiffness of the flexure varies with the displacement. A further consequence of the membrane stress is that the tensile stress developed in the diaphragm is balanced by radial tension at the restrained periphery of the diaphragm. The diaphragm in relation of the load to stress and the load to deflection, acts as if it is becoming stiffer and stiffer as the deflection increases. The diaphragm becomes more and more non-linear as the deflection increases.

This dilemma affects the design of the transducers in various ways. Transducers, for example, may include flexures which act as a force summing or force transmitting means to an unbonded strain gage, in which the deflection of the flexure is transmitted by mechanical linkage system to cause the displacement of a pair of wire supports to vary the tension and thus the electrical resistance of the wire. Bonded filament gages including wires and other strain sensitive filaments such as foil or photodeveloped or vacuum deposited films are well-known in this art.

Other types of transducers in which a deflection of the flexure is used to develop a signal are the inductive gages in which the deflection of the flexure is transmitted to a magnetic assembly to vary the reluctance of the magnetic circuit. The deflection may vary the capacitance of the capacities. Such transducers are well-known and are called capacitance gages.

The sensitivity of these and other transducers with which the art is familiar, i.e. the magnitude of the signal per unit of stimulus, i.e. the condition to be sensed by the transducer, is dependent on the rigidity of the flexure. In the gages other than the bonded gages, the sensitivity is the greater, the greater is the displacement per unit of the central portion of the flexure per unit of applied stimulus. In this case, of the bonded gages, the stress is developed in the flexure and transmitted to the filament which determines the signal level. The filament, when stressed, has its resistance changed. In this type of transducer, the sensitivity depends on the level of the stresses which varies also with the deflection of the flexure. The higher the stress to which the filament is subjected per unit of stimulus, the greater is the signal level i.e. the sensitivity.

The stress distribution in the flexure particularly if a diaphragm is composed of a radial and a tangential stress, and the sign, that is, whether compressive or tensile stress, varies as the radial distance of the locality of the stress increases. This phenomenon is employed in bonded gages where the filament is placed in a Wheatstone bridge arrangement. Reference is made to the Stedman Patent 3,071,745 for a complete description of such gages.

I have solved the dilemma arising from both non-linearity and sensitivity considerations, as applied to all of the aforementioned transducers by separating the stresses at the end portions of the flexure near the flexure support, from those in the central portion by means of a stress isolation flexure which decouples the stresses in the end portion of the flexure from those in the central portion. This decoupling connection is subjected to stresses in the form of a force couple which introduces a bending moment in the stress decoupling member. The inner edge of the end portion and the outer end of the central portion of the diaphragm, are not restrained in a direction parallel to the extension of these portions under no load conditions, except only by the weak restraining force of the bending moment of the flexure. In the case of the beam flexure, the end portion may be deemed to bend as a cantilever and the central portion may be deemed to be pivotally mounted at the ends of the central portion. In the case of the diaphragm, the end portion may approach in its action a diaphragm clamped at its outer periphery with a central hole, and the central portion as a diaphragm approach in its action to a diaphragm, supported but not rigidly held at its periphery.

The object of my invention is to design these dissimilar types of flexures, i.e., the cantilever, the beam pivotally supported at its ends, the doughnut diaphragm and the diaphragm supported but not restrained at its periphery, into a combination flexure. I connect the ends of the central portion by means of a flexible connection to the end portion of the flexure so as to substantially isolate the membrane stresses in the end and central portion, by substantially decoupling the stresses in the end portion from those in the central portion. I name such a flexure a duplex flexure.

The resultant deflection and the end thrust occurring at the ends of the end portion and central portion of the diaphragm exert a bending moment on the decoupling connection. The decoupling connection is made sufficiently flexible so that it does not introduce a resistance such as to produce a substantial membrane stress in the end and central portions.

I may thus increase the permissible deflection and stress level in the duplex flexure with satisfactory linearity to a degree much greater than is permissible by unitary flexures of the prior art, in which the central portion and the end portions are integral or are connected by stress transmitting connections.

In the case of the bonded gages where they are bonded at the end and central portions of the flexure of my invention, the stress isolation and decoupling connection has a further advantage in separating the sections to which the gages are bonded.

It is desirable that the filaments be oriented so that they extend in the direction of the major stress direction. As is shown in the Stedman patent, at each locality, there is both a tangential and a radial stress. In the central portion, the radial stresses predominate over the tangential stresses, while in the end portion, the tangential stresses predominate over the radial stress. As is shown in the Stedman patent, it is desirable to position the bonded gages in the selected portions of the diaphragm. While this is suitably done where the filaments are vapor deposited or photographically developed because of the techniques employed, it becomes a serious assembly problem for conventional foil or wire gages which are cemented to a diaphragm.

Even where the desired orientation of the filament and its radial distances are determined, the technician has a difficult job of assembly. Thus, for example, in a one-half inch diaphragm, a not unusual diaphragm in modern miniaturized transducers, the radial distance in which the filament at the edge may be assembled is of the order of 0.001 inch.

By means of the stress isolation connection in the duplex flexure of my invention, I mechanically isolate the end portion from the central portion so that there can be no overlap of filament from one portion to the other portion.

Another advantage of the duplex structure of my invention resides in that I can make the geometry of the cross-section of the central and end portions different.

As will appear from the Stedman patent, the variation and magnitude in the scalar value of the stress level, as a function of radial distance for diaphragms of uniform thickness, is substantially different in the portion adjacent the center of the diaphragm than that adjacent its periphery. However, by making the thickness of the sections adjacent the periphery so that it is different than that adjacent the center, the value of the stress levels may be made more nearly alike. The unit of stress will more nearly be alike at the central portion and the end portion. The percent variation and stress in the filament, the percent change in resistance per unit of deflection will be alike.

As will be understood by those skilled in this art, this will result in a Wheatstone bridge unbalance and thus a signal level which will be a more linear function of the force applied to the flexure.

As is shown in the Stedman patent, the level of stresses vary non-linearly as a function of the radial distance. Since the filament used has a finite length and breadth, and thus extends over a radial portion, the level of stress over the bonded surface of the filament varies from place to place. The result is thus an averaging of the stresses by the filament. In the duplex flexure of my invention, I may design the flexure so that in the portion where the filaments are bonded, the stress level is substantially uniform over the radial portion in which the filaments are bonded.

It is a further object of my invention to connect the end and central portions of the flexure by a stress decoupling connection.

It is a further object of my invention to connect the end and central portions of my flexure by a flexible connection in such manner that the connection is subjected to bending when the portions are deflected without a substantial transmission of the stresses of one portion to the other.

It is a further object of my invention to design a flexure in which the stress distribution in the several partions of the duplex flexure may be made to be substantially uniform.

It is a further object of the flexure of my invention that the cross section of the flexure may be adjusted so that the scalar value of the stress levels are substantially alike.

It is thus an object of my invention to produce a flexure in which the membrane stresses in the end portions and the central portion are substantially isolated.

It is a further object of my invention to employ these flexures in transducers.

It is a further object of my invention to employ these flexures in transducers by bonding filaments to the end and central portions of the flexure.

In the preferred embodiment of my invention, I connect the portions by means of a connection extending transversely to the extension of the portions in such manner, that on deflection of the portions, a bending moment is introduced into the connection without substantial transfer of stress between the connected regions of the flexure. When the terminal free end of the portions are displaced at a finite axial distance sufficient to permit such connection, I may employ a flexible plate if the flexure is a beam or a flexible ring, if the flexure is a diaphragm. Where the planes of the portions are so closely aligned as to make such a decoupling connection impractical, I may use a decoupling connection in the form having a U or V cross section with the free end of the U and V connected to the terminal ends of the flexure portions. In all of these forms the docoupling means is a flexible band in the form of a flat strip, or a ring or a ring with a reverse bend.

It is one of the features of my invention that the stiffness of the connected portions of the duplex flexure be substantially greater than the stiffness to bending of the stress decoupling flexure.

A practical application of the principle of my invention is to make the connection relatively long and a thickness substantially less than the adjacent thickness of the duplex flexure. Furthermore, the angle between the flexible band and the adjacent end of the duplex flexure should be substantially about 90°. Thus, not until the angle is 90°± about 10°, is as much as 10% of the membrane stress in the duplex transmitted from one portion to the other portion of the flexure, since the thrust due to membrane stresses may be made roughly proportional to the angle between the coupling connection and the duplex flexure portion to which it is connected.

This invention and preferred embodiments of my invention will be further described by reference to the drawings of which:

FIG. 1 is a vertical section of one form of transducer employing the flexure of my invention as a force collector;

FIG. 2 is a section on line 2—2 of FIG. 1;

FIG. 3 is a fragmentary vertical section of the transducer shown in FIG. 1 in which a modification of the flexure of FIG. 1 is employed;

FIG. 4 is a section on line 4—4 of FIG. 3;

FIG. 5 shows a modification of the transducer of FIG. 1 in which another version of the flexure of my invention is shown;

FIG. 6 is a section on line 6—6 of FIG. 5;

FIG. 7 is a section on line 7—7 of FIG. 5;

FIG. 8 is a fragmentary section of a further modification of the flexure of FIG. 7;

FIG. 9 is a section on line 9—9 of FIG. 8;

FIG. 10 is a vertical section through another form of my invention;

FIG. 11 is a section on line 11—11 of FIG. 10;

FIG. 12 is a section on line 12—12 of FIG. 10; and

FIG. 13 is a modification of FIG. 8.

In FIGURES 1 through 9 the transducing element herein referred to as a flexure, is positioned in the case 1.

Where the transducer is a pressure gage as in FIGS. 1 through 4 and 8 and 9, the case is provided with a pressure inlet 2.

In the accelerometers shown in FIGS. 5 through 7, 2 may be an inlet for the introduction of a damping liquid as is conventional in accelerometers.

In figures showing the pressure gage, a reference volume 3 is provided which may be at atmospheric pressure or under vacuum, or to which a second pressure inlet not shown may be connected and the accelerometer may be filled with damping liquid.

A flexure retaining ring 4 is screwed into the case to hold the flexure ring 5 in pressure tight position in the case 1, on the case shoulder 6. The flexure ring is connected either integrally or by rigid connection, such as welding to the flexure 7. The flexure 7 is formed of an annular ring 8 forming the end portion of the flexure and a central portion 9 spaced axially from the portion 8, connected by a thin flexible ring 10 to the edge portion. Anchored in the flexure ring 5, is a stop screw fixture 11 carrying a stop screw 12 which may be spaced from the central portion at a desired distance. The central portion and the edge portion may be made of uniform thickness or may be tapered either on one side, as shown in FIG. 1, or both sides of the flexure as shown in FIG. 3, and which like numbers indicate the same parts as of FIG. 1.

Two filamentary strain gages 13 of conventional type are bonded to the edge portion 8 in diametrically opposed position; two like filamentary strain gages 14 are bonded to the central portion at diametrically opposed positions. The filaments are oriented to be as nearly radially positioned as is conveniently possible, taking into account the number of filaments arranged in formation. Such position of the filaments are herein referred to as radially positioned filaments. Preferably the flexures are wedge-shaped with the thinnest section at the periphery to which the flexible ring 10 is attached. The tapers of the flexures are designed to produce a more uniform distribution of unit stress than can be obtained by employing sections of uniform thickness. Formulas for the design of the angle of the wedge to obtain a uniform stress distribution in a beam or diapragm, are well known to those skilled in the art.

The flexible ring is positioned at a radial distance $r$ from the center of the central portion 9, which is that fraction $r/a$ of the radial distance $a$ from the center of the central portion, to the outer periphery of the edge portion where it is attached to the flexible ring, such that the radial distance $r$ is at the location where the radial stresses change from compressive to tensile stresses, ideally where compressive and radial stresses are substantially zero. This radial distance $r/a$ for practical purposes, may be taken between $6/10$ and $7/10$ and ideally at .63 of the radial distance $a$.

When pressure is exerted in 2 the radial stresses developed in the outer surface of the central portion is a tensile stress, while the radial stresses developed in the outer surface of the edge portion 8 is a compressive stress. The outer surface is defined as the surface opposite to the inner surface against which the displacement force, for example, the pressure is exerted. The filaments 14 which are positioned at the outer surface, are stressed in tension along their length in the central portion, while the filaments 13 in the edge region are stressed in compression along their length. The four filaments may be connected into a Wheatstone bridge arrangement by conventional electrical connections not shown for simplicity as will be well understood by those skilled in the art. By proper design of the wedge thickness of the cross section of the central and edge portion, the scalar value of the tensile stress along the length of the filaments 14 in the central portion, may be made substantially uniform and to be substantially equal to the substantially uniform scalar value of the compressive stresses along the filament 13 in the edge portion. The central portion and the edge portion having the above characteristics, the ring 10 bends at the circular corners 13' and 14' so that the radial thrust in the central and edge portions are not communicated from the central portion to the edge portion, or from the edge portion to the central portion, but act as a couple to place the ring 10 in bending. The ring 10 pivots at the corners 13' and 14' with respect to the central and the edge portions. The ring 10 is thus in tension between the corners 14 and 13 and in bending at the corners. The net result is to decouple the radial stresses in the central region from the radial stresses in the edge portion.

In consequence, the membrane stresses are relieved. The peripheral end of the central portion and the inner end of the end portion translate and rotate substantially unrestrained by end radial thrust. The absence of the membrane stress results in a linear relationship between the stresses developed in the outward surfaces of the force collector, that is, the elements in the central portion 8 and the central portion 9 and the edge portion 8. This linearity extends over a range of force application and thus the axial displacement of the central portion and the edge portion is proportionately greater to the force supplied, than would be permissible if the central portion and the edge portions were rigidly connected as is the case of the continuous flat diaphragm clamped at its edge. Furthermore, the actual displacement of the various portions of the flexure, approximating as it does to displacement of a flat diaphragm which is supported but not clamped at its periphery, will have a much greater displacement per unit of applied force than would a diaphragm whose peripheral edge is clamped.

In the form of FIGS. 1 to 4, the central portion and the edge portion are not adjacent to each other, for example, as illustrated they are not coplanar and thus, a single flexible ring may not be employed as in FIGS. 1–4 as the decoupling connection between the central and edge portions.

In FIGURES 5 to 11 illustrating a modification of the flexure of my invention, the planes of the central and edge portions are adjacent to each other so that a ring of sufficient length to provide the desired flexibility is not practical. In order to obtain the desired stress decoupling flexibility, I may employ a decoupling flexure, which is formed into a U or V cross section as is illustrated in FIGURES 5 to 9.

FIGURE 5 has illustrated a beam used in connection with an accelerometer, and in FIGS. 10–12 is shown a beam used in connection with a pressure gage. The case 1 and the stop construction is the same as in FIG. 1. The flexure in FIGS. 5 and 10 is a beam integrally mounted on the upstanding beam supports 16 and 16' on the flexure ring 17. The beam is formed of two edge portions 18 and 18', rigidly connected at the outer ends to the beam support 16 and 16'. The central portion carries a mass 19a so that the beam may sense the acceleration imposed on the case 1, and thus act as an accelerometer. The outer end of the central portion and the inner end of the edge portion are connected by two flexible spring strips 22' and 23' at one end, and 22 and 23 at the other end of the central portion. The depending ends of each pair of strips are connected by a connection 24 and 24' which is substantially more rigid than the spring strips 22 and 22', 23 and 23'. The central portion is thus rigid in the portion of the mass 19 and may bend between 19, 23, 19' and 23'. This concentrates the stresses adjacent the stress decoupling flexure. The end portions 18 and 18' bend between the beam support 16 and 16' and the flexible spring strips 22 and 22'.

In the accelerometer, when the case 1 is displaced relative to the mass 19' on acceleration of the case, the sections 19 and 19' undergo reverse bending in a direction opposite to the direction of bending of the end regions 18 and 18'. The strain gages mounted on the central region and on the end portion are stressed in opposite directions and one pair is stressed in tension while the other pair is stressed in compression. They may be connected into a Wheatstone bridge arrangement as is conventional for strain gage use.

The stress developed in the central portion is decoupled from the stress in the end portions. The strips 22', 23', 22 and 23 undergo bending and rotation at the ends of the central and end portion. There is no substantial stress transferred between the central and end portions. As in the form of FIGS. 1–4, the inner end of the end portion and the outer end of the central portion translate and deflect substantially free of a restraining stress. Substantially no membrane stress is developed with consequences similar to those of the forms of FIGS. 1–4.

In FIGS. 8 and 13, the flexure is a diaphragm with the annular end portion 31 rigidly connected to the diaphragm support ring 30 and connected to the stress decoupling ring 35' at the circular corner 36. The decoupling ring has a U cross section made up of flexible legs 34 and 33, and a relatively rigid bottom end 35 connected to the circular corner 37 of the central portion 32. The cross section of the diaphragm, both at the annular end portion and the central portion may be of uniform cross section as in FIG. 13, provided with a stiffening boss 32' or wedge shaped in the same manner, and for the same purpose as in the form of FIG. 1.

Strain gage elements are mounted on both sides of the decoupling flexure at 38, 39, 40 and 41 for the purpose and function as described in connection with FIG. 1.

In the form of FIG. 8, the U ring acts in the same manner as the V strips of FIG. 5. Since, however, the V ring tends to be stiffer, the thickness and length of the legs of the U or V will be designed to have the required flexibility for the functions as described.

In FIGS. 10 and 11, the beam of FIGS. 5 and 6 is employed as the force transfer function in connection with a pressure gage. The parts of like number to those shown in FIG. 5, have the same meaning. The mass 19' is bored to receive the motion transmitting pulse 42 anchored by a nut 43. The post is rigidly connected to the diaphragm 44 which is welded at its periphery to the fixture 45, mounted between the pressure fitting 48 and the case 1.

The mass 19' is thus a boss and acts to rigidify the member concentrating the stress adjacent the decoupling flexure as in the previous form. On deflection of the diaphragm 44, the beam deflects in the manner described above and the membrane stresses are relieved as described above. The hollow nut 43 screwed to the fixture 45 acts as a stop for the beam.

I have thus devised a duplex flexure which contains two forms of flexural elements. End portions which are fixed at one end to a support and are guided but not restrained in any substantial degree at the other end, herein referred to as the unrestrained end. There is provided a central portion which is guided but not restrained at its end in any substantial degree, here referred to as the unrestrained edge or end of the central section. The guiding means is a stress decoupling connection between the unrestrained ends of the end portion and the central portion.

In the preferred embodiment the connection is a flexible one, preferably in the form of a flexible member extending at substantially 90° to the unrestrained ends of the central and the end portions. The decoupling connection is substantially more flexible in the portion adjacent the site of the stress decoupling connection. On displacement of the portions by an applied force, the portions deflect. A bending force is applied to the stress decoupling flexure but because of the flexibility of the stress decoupling connection, the ends of the portions connected to the decoupling connection translate and rotate substantially unrestrained by the stress decoupling flexure.

The median plane central portion may be coplanar with the median plane end portion or have its median plane displaced from the median plane end portion. It is to be observed that since the cross sectional form of the flexure may be wedge shaped and not with parallel exterior surfaces, the reference to the mid plane or median plane through the flexure, is a proper reference plane. Where the flexure is a diaphragm, the central portion is preferably positioned concentrically with the annular end portion and may be coplanar with or axially displaced from the annular end portion. The displaced plane of the central portion may be, and preferably is, coplanar.

The said flexures may be employed as transduction elements by mounting bonded strain gages on the central and end portions at a locality adjacent said flexible band.

While I have described particular embodiments of my invention for the purpose of illustration, it should be understood that various modifications and adaptations thereof may be made within the spirit of the invention, as set forth in the appended claims.

I claim:

1. A flexure comprising a central flexible portion and a flexible end portion, means to fix one end of the end portion, the ends of said central portion and the other end of said end portion being guided but not substantially restrained, means to guide but not substantially restrain said ends in any substantial degree, said means comprising a flexible band connected to and extending substantially 90° to said guided ends.

2. A flexure comprising a diaphragm, said diaphragm having a circular central portion and an annular end portion, said central portion positioned concentrically with said end portion, the outer periphery of said annular end portion being fixedly connected to a support, a flexible band connecting the inner periphery of said annular portion and the outer periphery of said central portion, said flexible band connected to the ends of said portions and extending at substantially 90° to said portions.

3. A flexure comprising a diaphragm, said diaphragm having a circular central portion and an annular end portion, said central portion positioned concentrically with said end portion, the median planes of said portions being axially displaced, the outer periphery of said annular end portion being fixedly connected to a support, a flexible band connecting the inner periphery of said annular portion and the outer periphery of said central portion, said flexible band extending at substantially 90° to said portions.

4. A flexure comprising a diaphragm, said diaphragm having a circular central portion and an annular end portion, said central portion positioned concentrically with said annular end portion, the median planes of said annular end portions and said central portion being coplanar, the outer periphery of said annular end portion being fixedly connected to a support, a flexible band connecting the inner periphery of said annular section and the periphery of said central portion, said flexible band extending at substantially 90° to said portions.

5. A flexure comprising a diaphragm, said diaphragm having a circular central portion and an annular end portion, said central portion positioned concentrically with said annular end portion, the median planes of said annular end portions and said central portion being axially displaced, the outer periphery of said annular end portion being fixedly connected to a support, a flexible band connecting the inner periphery of said annular end portion and the outer periphery of said central portion, said band comprising two circular flexible band members, one circular band connected at one end to the inner periphery of said annular end member and the other of said circular bands connected at one end to the outer periphery of said central portion, said bands extending substantially 90° from the said median planes, said bands being connected to each other at their other ends.

6. A beam flexure having two end portions, means to fix one of each of said end portions, the central portion positioned between the other ends of said end regions, the ends of said central portion and said end portions being guided but not substantially restrained, means to guide but not restrain said ends in any substantial degree, said means comprising a flexible band connected to said end portions and to said central portion and extending substantially 90° to said portions.

7. In the flexure of claim 6, the median plane of said central portion being substantially coplanar with the median planes of said end portion, and said flexible band comprising flexible band members, one end of one of said band members connected to an end of one of said end portions and one end of the other of said members connected to an end of said central portion, said members connected at their other ends.

8. A transducer comprising a beam flexure, said beam flexure comprising a pair of flexible end portions, means to fix one end of each of said end portions, an intermediate portion, the ends of said intermediate portion and the other end of said end portion being guided but not substantially restrained, means to guide but not substantially restrain said ends in any substantial degree, said means comprising a pair of flexible bands, each band at one end of said band connected to said end portions, the other end of each band connected to said intermediate portion, said bands extending substantially 90° to said end portions and to said intermediate portion, strain gages bonded to said end portions and said intermediate portion.

9. A flexure comprising a central flexible portion and a pair of flexible end portions, means to fix one end of each of the end portions, the ends of said central portion and the other end of said end portions being guided but not substantially restrained, means to guide but not substantially restrain said ends in any substantial degree, said means comprising a flexible band connected to and extending substantially 90° to said guided ends.

10. A transducer comprising a flexure, said flexure comprising a diaphragm, said diaphragm having a circular central portion and an annular end portion, said central portion positoned concentrically with said end portion, the outer periphery of said annular end portion being fixedly connected to a support, a flexible band connecting the inner periphery of said annular portion and the outer periphery of said central portion, said flexible band connected to the ends of and extending at substantially 90° to said portions, strain gages bonded to said annular end portion and to said central portion, and means to apply a force to said central portion of said flexure.

11. A transducer comprising a flexure, said flexure comprising a diaphragm, said diaphragm having a circular central portion and an annular end portion, said central portion positioned concentrically with said end portion, the median planes of said portions being axially displaced, the outer periphery of said annular end portion being fixedly connected to a support, a flexible band connecting the inner periphery of said annular portion and the outer periphery of said central portion, said flexible band extending at substantially 90° to said portions, strain gages bonded to said annular end portions and to said central portion, and means to apply a force to said central portion of said flexure.

12. A transducer comprising a flexure, said flexure comprising a diaphragm, said diaphragm having a circular central portion and an annular end portion, said central portion positioned concentrically with said annular end portion, the median planes of said annular end portions and said central portion being coplanar, the outer periphery of said annular end portion being fixedly connected to a support, a flexible band connecting the inner periphery of said annular portion and the periphery of said central portion, said flexible band extending at substantially 90° to said portions, strain gages bonded to said annular end portions and to said central portion, and means to apply a force to said central portion of said flexure.

13. A transducer comprising a flexure, said flexure comprising a diaphragm, said diaphragm having a circular central portion and an annular end portion, said central portion positioned concentrically with said annular end portion, the median planes of said annular end portion and said central portion being axially displaced, the outer periphery of said annular end portion being fixedly connected to a support, a flexible band connecting the inner periphery of said annular end portion and the outer periphery of said central portion, said band comprising two circular flexible band members connected to and extending substantially 90° from the said median planes, said bands being connected to each other at their other ends, strain gages bonded to said annular end portion and to said central portion, and means to apply a force to said central portion of said flexure.

14. A transducer comprising a beam flexure, said beam flexure having two end portions, means to fix one end of said end portions, the central portion positioned between the other ends of said end portions, the ends of said central portion and said end portions being guided but not substantially restrained, means to guide but not restrain said ends in any substantial degree, said means comprising a flexible band connected to said end portions and to said central portion and extending substantially 90° to said portions, strain gages bonded to said end portions and said central portions and means to apply a force to the central portion of the beam flexure.

References Cited

UNITED STATES PATENTS

| Re. 25,924 | 12/1965 | Stedman | 338—2 |
| 3,022,672 | 2/1962 | Dimeff et al. | 73—398 |
| 3,138,027 | 6/1964 | Li | 73—398 |
| 3,168,718 | 2/1965 | Swartz et al. | 338—42 |
| 3,204,463 | 9/1965 | Taber | 73—398 |
| 3,221,283 | 11/1965 | Ziggell | 338—47 |
| 3,269,184 | 8/1966 | O'Connor | 338—4 |

RICHARD M. WOOD, *Primary Examiner.*

W. D. BROOKS, *Assistant Examiner.*